United States Patent
Chen (10) Patent No.: US 11,983,289 B2
(45) Date of Patent: May 14, 2024

(54) METHOD AND SYSTEM FOR MANAGING LOGIN INFORMATION DURING A DEBUGGING PROCESS

(71) Applicant: Kyocera Document Solutions, Inc., Osaka (JP)

(72) Inventor: Tai Yu Chen, Dublin, CA (US)

(73) Assignee: Kyocera Document Solutions Inc., Osaka (JP)

( * ) Notice: Subject to any disclaimer, the term of this patent is extended or adjusted under 35 U.S.C. 154(b) by 343 days.

(21) Appl. No.: 17/563,636

(22) Filed: Dec. 28, 2021

(65) Prior Publication Data

US 2023/0205907 A1    Jun. 29, 2023

(51) Int. Cl.
  *G06F 21/62*  (2013.01)
  *G06F 21/31*  (2013.01)
  *G06F 21/45*  (2013.01)
  *H04L 9/40*  (2022.01)

(52) U.S. Cl.
  CPC ........ *G06F 21/6218* (2013.01); *H04L 63/083* (2013.01); *H04L 63/105* (2013.01); *H04L 63/20* (2013.01)

(58) Field of Classification Search
  CPC ...... G06F 21/6218; G06F 21/31; G06F 21/45; H04L 63/083; H04L 63/105; H04L 63/20
  See application file for complete search history.

(56) References Cited

U.S. PATENT DOCUMENTS

| | | | |
|---|---|---|---|
| 9,300,671 B1 * | 3/2016 | Barak | H04L 63/10 |
| 9,882,914 B1 * | 1/2018 | Co | H04L 63/205 |
| 10,715,507 B1 * | 7/2020 | Spears | G06Q 20/405 |
| 10,789,328 B1 * | 9/2020 | Jadhav | H04L 63/168 |
| 10,972,458 B1 * | 4/2021 | Gaeta | G06F 21/32 |
| 11,082,487 B1 * | 8/2021 | Jain | H04L 67/1089 |
| 2006/0143447 A1 * | 6/2006 | Vasishth | H04L 63/102 |
| | | | 713/166 |
| 2006/0218149 A1 * | 9/2006 | Patrick | G06F 21/6218 |
| | | | 707/999.009 |
| 2007/0056031 A1 * | 3/2007 | Sivaramakrishna | H04L 41/085 |
| | | | 726/12 |
| 2008/0148351 A1 * | 6/2008 | Bhatia | G06F 21/6218 |
| | | | 726/2 |
| 2010/0077457 A1 * | 3/2010 | Xu | H04L 63/105 |
| | | | 726/4 |
| 2011/0225625 A1 * | 9/2011 | Wolfson | H04L 63/205 |
| | | | 726/1 |
| 2015/0186635 A1 * | 7/2015 | Nakhjiri | H04L 69/22 |
| | | | 726/17 |

(Continued)

*Primary Examiner* — Darren B Schwartz
(74) *Attorney, Agent, or Firm* — Millen, White, Zelano & Branigan P.C.; William F. Nixon (57) ABSTRACT

A method and a system for managing login information of a computing system during a debugging process are disclosed. The login information is composed according to a number of roles and their associated policies. Some roles have higher authorized levels to view sensitive information. To protect privacy, a technician who access the computing system will not be able to view all content of information. If this restriction prevents the technician to debug the system, the technician can request an upgrade. A new login information with a higher authorized level will be temporarily granted to the technician that allows the technician to view and access more content of information.

18 Claims, 5 Drawing Sheets

(56) References Cited

U.S. PATENT DOCUMENTS

| | | | | |
|---|---|---|---|---|
| 2016/0127352 A1* | 5/2016 | Xu | ...................... | H04L 63/0815 |
| | | | | 726/8 |
| 2016/0352752 A1* | 12/2016 | Bush | .................. | H04L 63/0838 |
| 2017/0118223 A1* | 4/2017 | Mathew | .................. | G06F 21/31 |
| 2017/0295206 A1* | 10/2017 | Feiertag | .............. | H04L 63/1425 |
| 2019/0258799 A1* | 8/2019 | Harris | ................... | G06F 21/552 |
| 2019/0332791 A1* | 10/2019 | Mahalle | .................... | H04L 9/50 |
| 2021/0306334 A1* | 9/2021 | Han | .................... | H04L 63/0884 |
| 2022/0311767 A1* | 9/2022 | Ouellet | ................. | H04L 9/0822 |
| 2022/0353256 A1* | 11/2022 | Cizer Kobrinsky | .. | H04L 63/102 |
| 2023/0005391 A1* | 1/2023 | Sharma | ................ | G06F 21/602 |

* cited by examiner

METHOD AND SYSTEM FOR MANAGING LOGIN INFORMATION DURING A DEBUGGING PROCESS

FIELD OF THE INVENTION

The present invention relates to a method and a system for managing login information during a debugging process. More particularly, the present invention relates to a method and system for authorizing and updating the login information based on a managing policy during the debugging process.

DESCRIPTION OF THE RELATED ART

After launching a new software in a computing system, bugs would sometimes happen while the computing system is in operation, resulting in a malfunction of the computing system. When the malfunction happens, it will require an IT (information technology) technician to log in the system in order to obtain and analyze data of information of the system. The technician may be employed by the system owner or an outside contractor company.

Conventionally, when the technician logs into the system, he/she would be able to see most of data of information stored in the system, including user data. User data contains personal or secure information which may be private and sensitive to the public. As the company usually hires IT technicians from out-source contractors, it is difficult to guarantee the security of such personal information.

Therefore, to make sure the security of the sensitive information, when the technician logs into the system, he/she will first obtain a permission from a system manager before connecting to the system. In some cases, the system manager may run some manual code in order to scrub the data of sensitive information. Such methods still have drawbacks as the system manager has to be a gatekeeper for all logins and the operation is not smooth.

Thus, there is still a need for managing the login information for persons with different job levels so that only suitable information can be revealed to appropriate persons.

SUMMARY OF THE INVENTION

A method for managing login information of a computing system during a debugging process is disclosed. The method comprises entering login information to the computing system, wherein the login information includes a password and is associated with a policy. The method further comprises certifying the login information and authorizing a first content of the computing system to be displayed based on the login information. The method also comprises requesting an upgrade to view more content, and receiving new login information relative to the upgrade request, wherein the new login information includes a new password. After entering the new login information to the computing system, a second content of information of the computing system will be displayed. The new login information associates with a new policy and the second content of information has more content of information than the first content of information.

The method further comprises setting up a number of roles for personnel who are authorized to access the computing system. Each of the number of roles has a different authorization level for viewing different content of information based on polices designated thereto. Further, the new login information is a stream of login data including at least a new password and a time stamp that expire after a predetermined period of time.

The method further comprising redacting sensitive information based on a policy associated with the logging information so that the first content of information contains redacted information.

An alternative method for managing login information during a debugging process is also disclosed. The method comprises setting up a number of roles, each of the number of roles having a different authorization level for viewing different content of information based on polices designated thereto, logging in a system that requires an assistance with a login information including a username and a password, and displaying a first content of information based on the login data, wherein the login information is associated with an authorization level. The method further includes requesting a token for elevating the authorization level in order to view more content of information, when the currently displayed first content of information is not sufficient for an operator to debug an error, and sending the token together with a new login information if the request for the token is granted. According to the disclosed embodiments, the token includes an activation key and a limited activated time period that allows the operator to view more content information during the debugging process.

In accordance with the disclosed embodiments, the login information includes system owner login information and system operator login information. The system owner login information has a higher authorization level so that an operator, when logging in the computing system using the system owner login information, can view more content of information of the computing system than using the system operator login information to log in the computing system.

Further, the policies include removing or masking user names, showing user names, remove or mask sensitive data and showing sensitive data.

A system for managing login information of a computing system is further disclosed. The system includes a managing module for setting up a number of roles for personnel who are permitted to access the computing system, wherein each of the number of roles has a different authorization level for viewing different content of information of the computing system based on policies designated thereto, and wherein each of the role is associated with a login information including at least a password. The system also includes a login module for receiving and authenticating the login information, wherein the login information allows the personnel to view the designated content of information on the computing system. An activating module is also included for activating viewable content relative to the login information in response to a result of the authentication received from the login module, and an upgrading module is included for upgrading the login information upon receiving an upgrade request, wherein the upgrading module communicates with the managing module to retrieve a new login information associated with an upgrade level and to send the new login information to an operator who requests the update.

According to the disclosed embodiments, the new login information is a stream of login data including at least a new password and a time stamp that is expired after a predetermined period of time. The new login information allows a user to access more content of information of the computing system when logging in the computing system with the new login information.

The system further comprises a login data stream transformer for transforming the login data into at least an owner log stream and an operator log stream. The owner log stream has a higher authorization level than the operator log stream so that when a user logs in the computing system with the owner log stream, he/she is able to view more content of the computing system.

Further, the activating module includes a data redacting device for redacting sensitive information in the designated content of information before displaying the designated content of information to a user who enters the login information.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The preferred embodiments of the present invention manage login information for a computing system based on job levels of personnel in a company. More particularly, the preferred embodiments of the present invention can manage login information based on company policies during a debugging process so that a technician or an operator (hereinafter "technician" for brevity) can access data of the system for debugging purpose without seeing sensitive customer data. This is particular important as the technician is usually employed at an outside contracting company. Further, it is essential to protect sensitive information, such as user data of the company, from being displayed.

The existing solution for protecting sensitive information is to blur or block the information of a user data when being represented to the technician. This method involves requesting permissions from a company administrator and sometimes the company administrator enters manual codes to scrub data of the sensitive information, which increases the work burden to the company administrator.

The disclosed embodiments of the present invention relates to a method and a system for managing and updating login information of operator personnel during a debugging process. In accordance with the disclosed embodiments, the administrator of the company creates a number of roles based on job levels and policies of the company. Each role may represent a combination of the policies. Examples of the policies may include "remove user name" or "mask user name." Further, each role associates with a specific login information. Thus, when the technician logs into the computing system of the company, the technician can only see contents associated with his/her login information. In some cases, the data of information displayed to the technician are not enough for detecting bugs. According to the disclosed embodiments, the technician may request for an upgrade of his/her login information. Details of the system and method will be described with reference to FIGS. 1-3.

Figure 1:
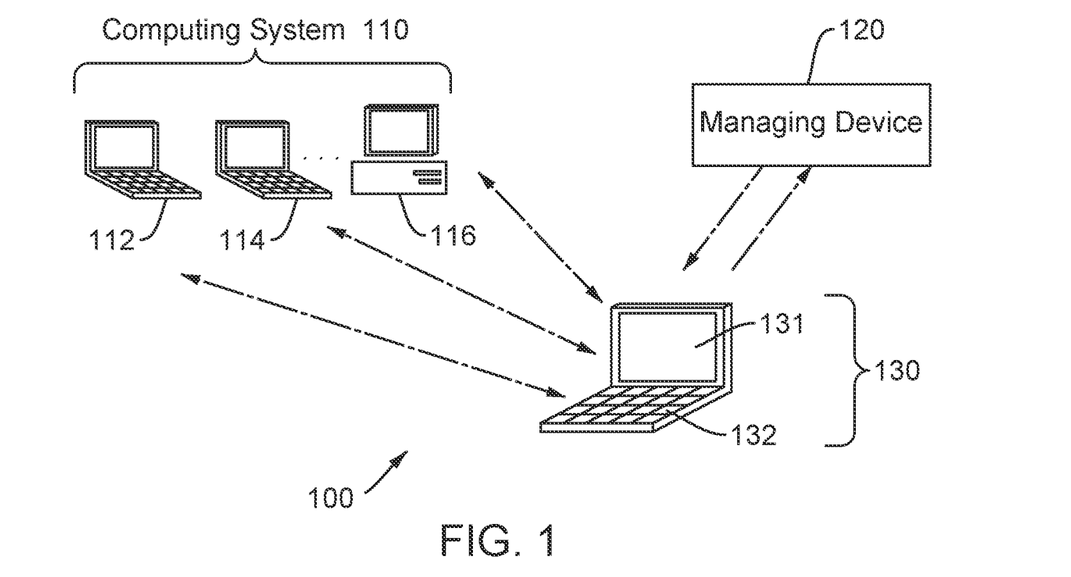
FIG. 1 illustrates a schematic block diagram of a managing system for managing login information during a debugging process in accordance with the disclosed embodiments.

FIG. 1 illustrates a block diagram of system 100 for managing login information during a debugging process in accordance with the disclosed embodiments. Managing system 100 includes computing system 110, managing device 120, and debugging device 130. Computing system 110 is a system that includes at least one computing device 112, 114, and 116. Normally, when bugs occur on any of computing devices 112-116 of computing system 110, a user of the computing device having a problem will contact an IT technician for solution. Take an example of computing device 112 that encounters bugs. In this case, debugging device 130 may be operated by the IT technician to access computing device 112 for detecting and diagnosing bugs occurred in computing device 112. Debugging device 130 may be a part of computing system 110 or a remotely-located device that communicates with computing system 110 via an internet. Debugging device 130 may be a computing device as those 112-116 and includes a display unit 131 and input unit 132. When debugging device 130 connects with computing device 112, the technician will be able to see contents of information of computing device 112 on display unit 131 of debugging device 130 and to access data of computing device 112 through keyboard unit 132.

Managing device 120 manages login information that allows debugging device 130 to access computing device 112 in order to debug the computing device 112. Managing device 120 may be a part of computing system 110 or a separate system that communicates with computing system 110 through an internet. According to the disclosed embodiments, managing device 120 designates a number of roles with various-level login information based on job roles in a company. Each of the login information associates with policies that determine what contents of information are allowed to be displayed on display unit 131 of debugging device 130. In the disclosed embodiments, the policies may include, for example, "mark user name" or "remove user name." That is, once the technician logs into the computing system of the company, i.e., when debugging device 130 connects with computing device 112, the technician who operates debugging device 130 can only see contents of information that are designated to his/her login information. This feature is particularly important. As the technician is not allowed to see more contents of information than what he/she is restricted to, the private information or sensitive information, such as user name, and personal information of the user can be fully protected.

Figure 2:
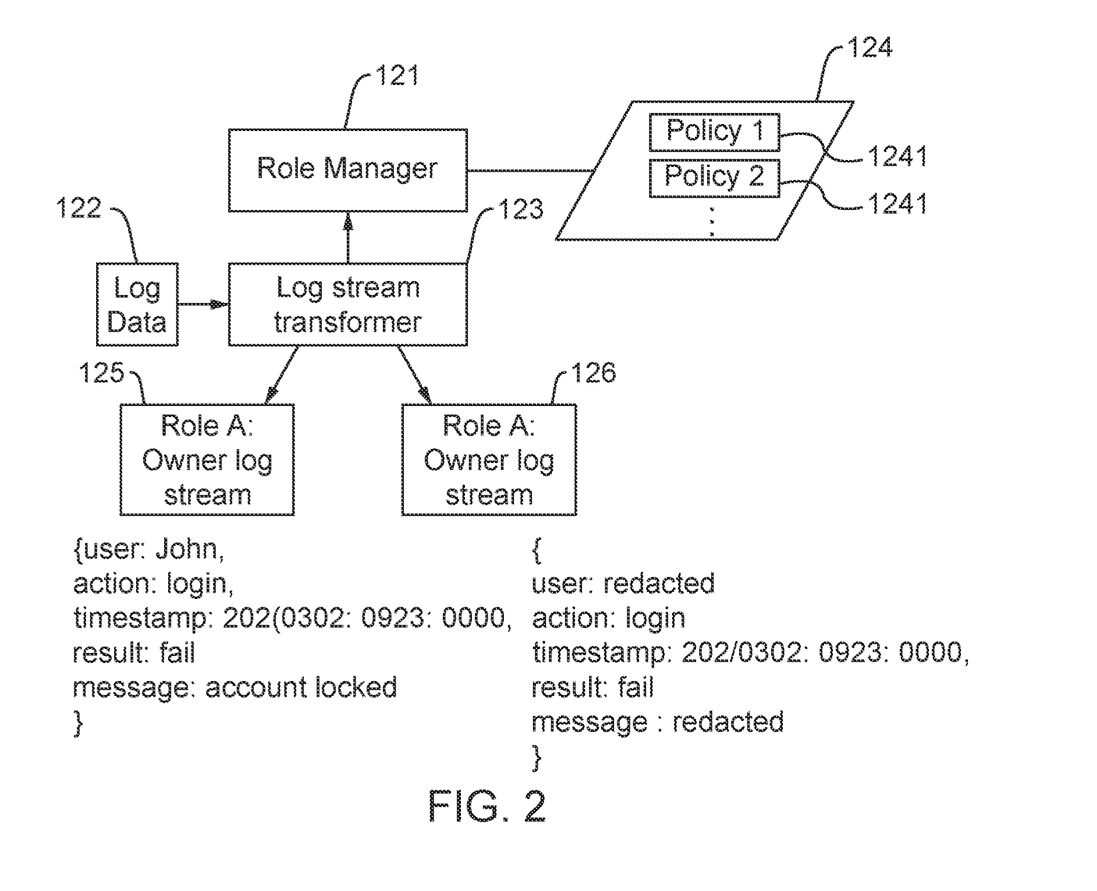
FIG. 2 illustrates a schematic block diagram of a managing device within a managing system in accordance with the disclosed embodiment.

FIG. 1 illustrates details of managing device 120 in accordance with the disclosed embodiments. As show in the figure, managing device 120 includes role manager 121 that sets up a number of roles, each of which associates with a policy 1241 or a combination of policies stored in database 124. Role managing device 121 also manages login information based on the number of roles (e.g., job roles) and policies 1241 stored in policy database 124.

Role manager 121 sets up a number of roles and associates the number of roles with polices 1241 saved in policy database 124. Each of the number of roles has a different authorization level for viewing different content of information of computing system 110 based on policies designated thereto, and each of the role is associated with a login information. The login information includes a login user name and a password. According to the disclosed embodiments, role manager 121 assigns a policy or a combination of polices to each of the login information for various users to use to log in computing system 110. The policy may include instructions like "mark user name" and "block user name," and the policy is determined based on the job roles. It is noted that the user name to be "marked" or "blocked" is a user name shown in the content of information that is private or sensitive to the public or the IT technician who accesses the computing system for the purpose of debugging problems. Without such restrictions, it is often happened that when a third-party technician connects to computing system 100, the technician can view most data of information of the system, including user names, user information, users' faces, company financial data, other sensitive information, and so on. Therefore, the disclosed embodiments are to prevent sensitive information from leaking and to protect personal and company's privacies by applying multiple levels of polices to login information.

The number of roles may be determined based on the company profile. For example, for a debugging purpose, the roles may include an "owner role" and an "operator role." Owner role may refer to personnel who are employees of a company that owns computing system 110. Operator role may refer to technicians or contractors who are not employee of the company but work as a contractor, for example, a contracted IT technician who is needed to debug computing system 110. To ensure security of the computing system, the persons who is in the operator role category will get less access to sensitive information of system 110. That is, depending on the job roles and the policies, various login information will result in different contents of information that can be displayed on display unit 131.

The number of roles may also include multiple layers of job roles. For example, an accounting manager is able to access the financial information about the company revenue, but a filing clerk is not allowed to see such information. In this case, the policy associated with the login information of the filing clerk may be "mask the company revenue" or "block the company revenue", whereby the filing clerk is restricted or prohibited from accessing company's financial information. The disclosed embodiments mainly focus on the debugging process.

Managing device 120 further includes log stream transformer 123 that receives log data 122 of login information entered by a user who tries to access computing system 110 (FIG. 1). After receiving log data 122, log stream transformer 123 analyzes log data 122 to determine what role of log data 122 is associated with. As shown in FIG. 2, log data 122 may be related to role A which is an owner log stream 125 or role B which is an operator log stream 126. Log stream transformer 123 then reports the role of log data 122 to role manager 121. Since the role associates with one policy 1241 stored in policy database 124, role manager 121 then applies the corresponding policy to redact sensitive data that need to be marked or blocked before being displayed to the person. For example, if the technician who works as a contractor enters login information during a debugging process and his/her login information associates with a policy "masks user name," he/she will see contents of information with user name masked or redacted.

Figure 3:
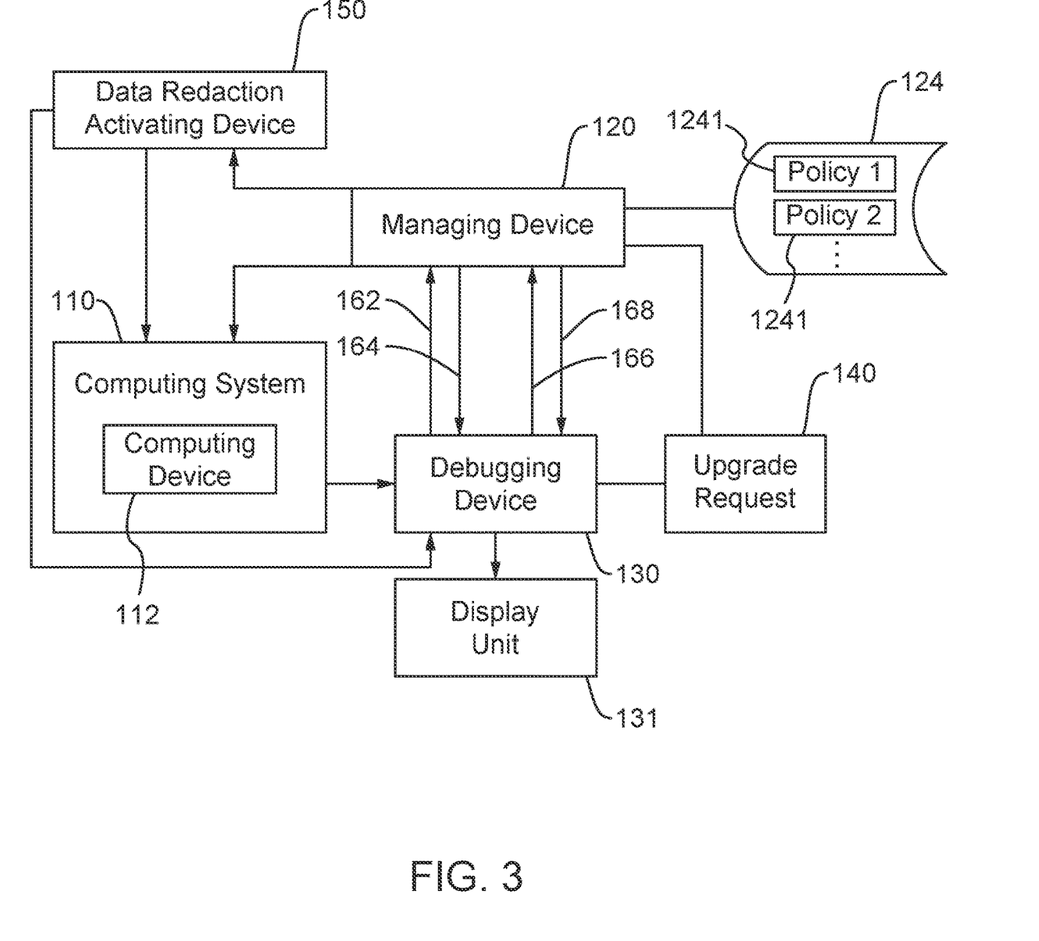
FIG. 3 illustrates a schematic block diagram of a managing system in more detail in accordance with the disclosed embodiments.

FIG. 3 illustrates a block diagram of managing system 100 in more detail according to the disclosed embodiments. As described above, each of the login information associates with a policy 1241. As a result, when a user logs in computing system 110 by entering the login information, managing system 100 certifies the user's credential and processes contents of information to be displayed to the user based on the policy associated with the login information. Processing the content of information to be displayed may include redacting sensitive information, such as user's names, addresses, images, and so on based on the associated policy.

FIG. 3 shows that managing system 100 further includes data redaction activating device 150 for redacting the sensitive information. When a bug occurs at computing system 110, for example, at computing device 112 of computing system 110, a user of computing device 112 would request a debugging service from an IT technician. To debug the system, the IT technician first enters a login information 162 that comprises the technician's user name and a password using debugging device 130 in order to access content of information of computing device 112. After receipt of the login information, managing device 120 checks the credential of the technician (arrow 164) based on the login information and refers a policy associated with the login information to data redaction activating device 150. Next, data redaction activating device 150 redacts sensitive information of contents of information of computing system 110 according to the policy. Therefore, after debugging device 130 connects with computing system 110, only redacted content of information will be sent to debugging device 130 and displayed on display unit 131.

As described with reference to FIG. 2, the number of roles may include a manager role and an operator role, in which the manager role can view more content of information than the operator role level can. However, there may be more role levels in a computing system based on the infrastructure of the company who owns the computing system. For example, the number of roles may also include an executive role, an assistant role, and so on, each of which associates with a different policy. In the disclosed embodiment of FIG. 2, the original login information allows the technician to view operator log stream 126, in which the user name is redacted and includes a time stamp, such as 20210302:0923:0000. In this example, the displayed distracted content of information corresponding to the original login information does not allow the technician to access enough data to debug the system. Thus, the result is "fail" and it shows the message is "redacted."

Back to FIG. 3, according to the disclosed embodiments, when the displayed content of information is not enough for the technician to debug the problem, it is important that the technician could request for an upgrade 166. The upgrade request may include one or more reasons for the request. The reasons may be expressed in texts or codes that could be custom-defined. By checking the reasons for upgrade request, managing device 120 determines if such a upgrade request should be granted, and if granted, sends a new login information 168 to debugging device 130. The technician then use the new login information 168 to access computing system 110 and new content of information with less redacted data will be displayed on display unit 131.

The new login information may also be called as "a token" or "an elevated role expiration token" that includes a new password and a time stamp. As shown in the example of FIG. 2, the new login information allows the technician to view owner log stream 125 so that the technician can now see the user name, e.g., John. The new login information also includes a time stamp 20210302:0923:0000. In this example, the result is "fail" and a message indicates that the account is locked. In this manager role, the technician is able to see what went wrong with the system and is able to fix it.

Sometimes, the authorized level of the new logging information is still not good enough to see sufficient content of information for debugging problems. When this happens, the technician could ask for another upgrade of login information. The procedures of upgrading another login information are similar to those described above. Thus, the detailed descriptions will be omitted.

Figure 4:
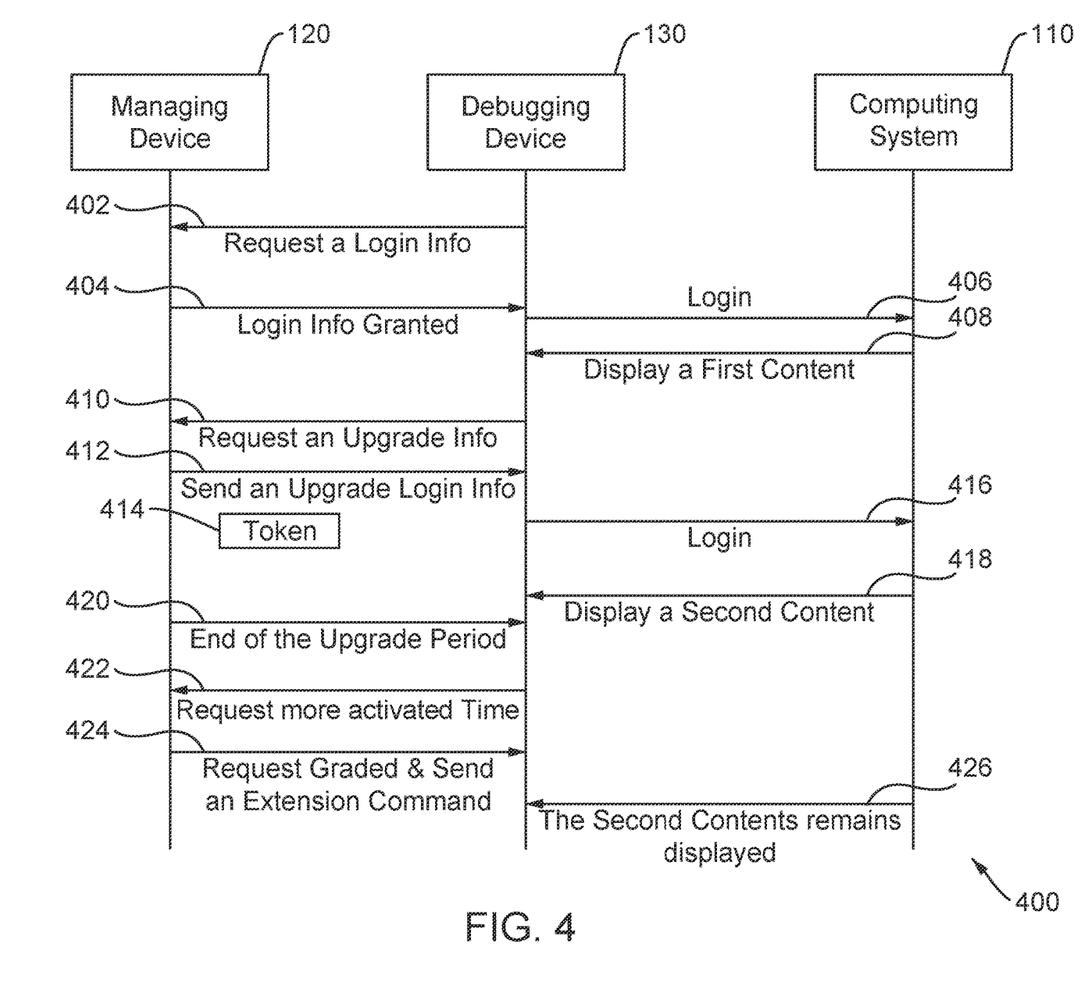
FIG. 4 illustrates a flow diagram for upgrading login information to access more content of information during a debugging process in accordance with the disclosed embodiments.

FIG. 4 is a flow diagram illustrating upgrading login information for debugging device 130 to access more content of information of computing system 110 during a debugging process. In FIG. 4, data redaction activating device 150 is omitted for brevity. Further, in the following exemplary embodiment, the technician requests an initial login information for connecting to the computing system which needs debugged. However, it is not necessary for the technician to request a permission. In some cases, the technician has his/her own login information that allows the technician to connect to the computing system.

As shown in FIG. 4, when the technician receives a service request to debug computing system 110, he/she first requests a login information at step 402 through debugging device 130 from managing device 120. Managing device 120 grants the request and sends an initial login information at step 404 to debugging device 130. The initial login information is associated with a policy determined by managing device 120 and comprise at least a password. Debugging device 130 then logins into computing system 110 by entering the initial login information, shown at step 406. In reply, debugging device 130 connects with computing system 110 and is able to view content of information of computing system 110 on its display unit, such as display unit 131, at step 408. As the initial login information relates to an operator role log data stream, the technician is only allowed to view the content of information that an operator role is allowed to view. That is, the technician sees redacted content of information.

When the viewable content of information is not enough for the technician to analyze data to debug the problem, the technician is able to request an upgrade login information, as shown at step 410. As described above, the request includes a pre-determined code or texts to indicate the reasons why the upgrade is necessary. By analyzing the pre-determined code or texts, managing device 120 grants the request and sends an upgrade login information, at step 412, to debugging device 130. The upgrade login information includes a token 414 that includes a new password and a time stamp. The upgrade login information may upgrade the technician's role from the operator role to a manager role. Therefore, after entering the upgrade login information at step 416, a content of information relative to manager role data log stream will be display on debugging device 130, shown in step 418. This allows the technician to view more content of information for a limited period of time defined by the time stamp.

In some cases, the technician may not be able to complete the debugging process within the limited period of time, as shown at step 420. When this happens, the technician may send another request at step 422 to managing device 120 to ask for more time. When this request is granted 424, managing device 120 will send an upgrade login information extension command to debugging device 130 so that the technician maintains the manager role and the second content of information continues displayed on debugging device 130, shown in step 426.

Figure 5:
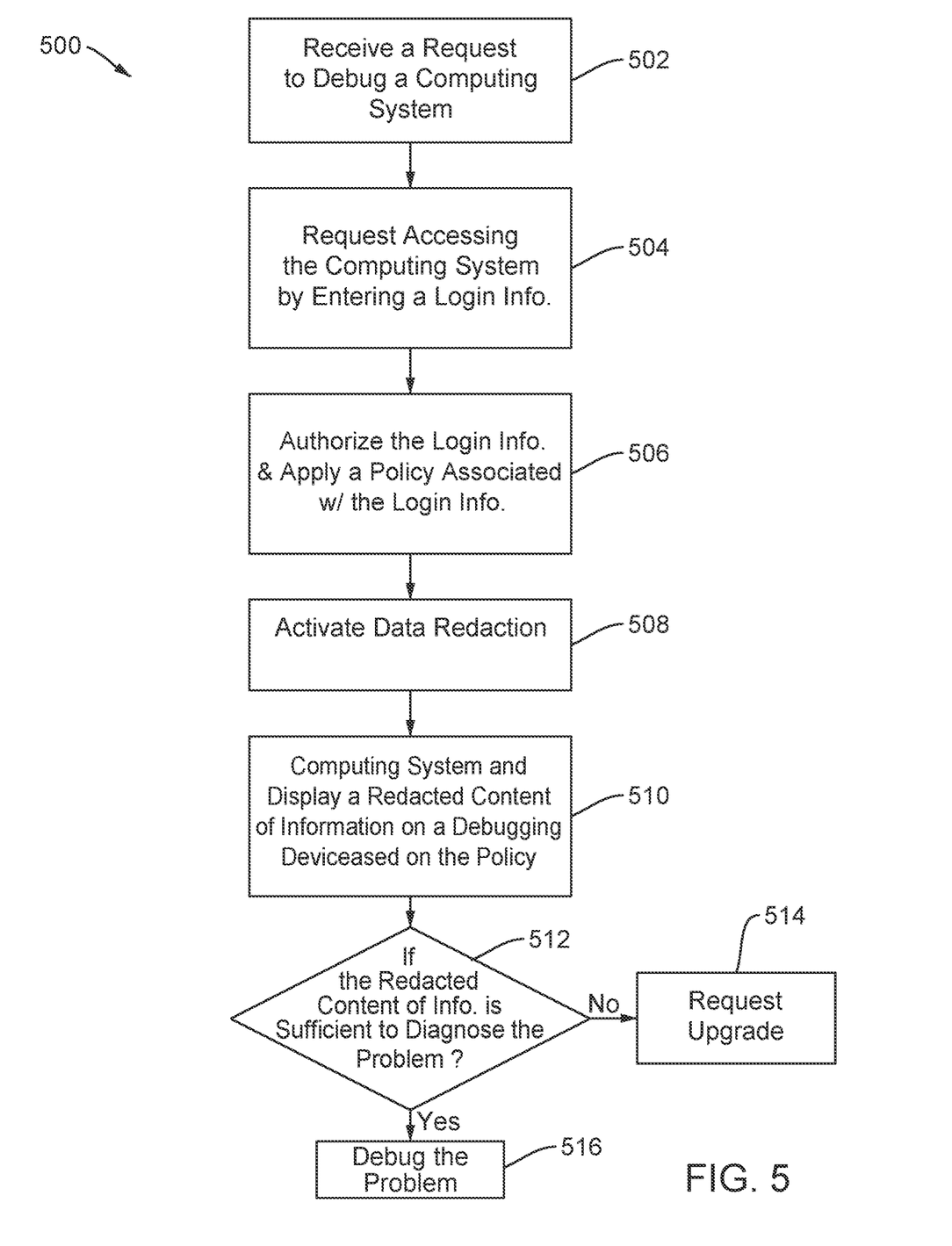
FIG. 5 illustrates a flow diagram for managing login information to a computing system during a debugging process in accordance with the disclosed embodiments.

FIG. 5 illustrate a flow diagram 500 for managing login information to a computing system during a debugging process in accordance with the disclosed embodiments. The debugging process begins when a technician receives a request to debug computing system 110, as shown at step 502. Step 504 executes by the technician requesting a permission to access the data of computing system 110 by entering a login information on debugging device 130.

Step 506 executes by managing device 120 checking the credential of the technician and determining which policy is associated with the login information. For example, if the login information of the technician belongs to an operator role, some sensitive information of computing system 110 will be redacted. Thus, step 508 executes by data redaction activating device 150 redacting sensitive information based on the policy and step 510 executes by connecting debugging device 130 with computing system 110 and displaying redacted content of information on display unit 131 of debugging device 130. This allows the technician to access the data of computing system 110 in order to debug problems of computing system 110.

Step 512 executes by determining if the content of information that can be accessed by the technician is enough to debug the problems. If the answer is yes, then the debugging process is completed at step 516. If the answer is no, the technician may request an upgrade at step 514.

Figure 6:
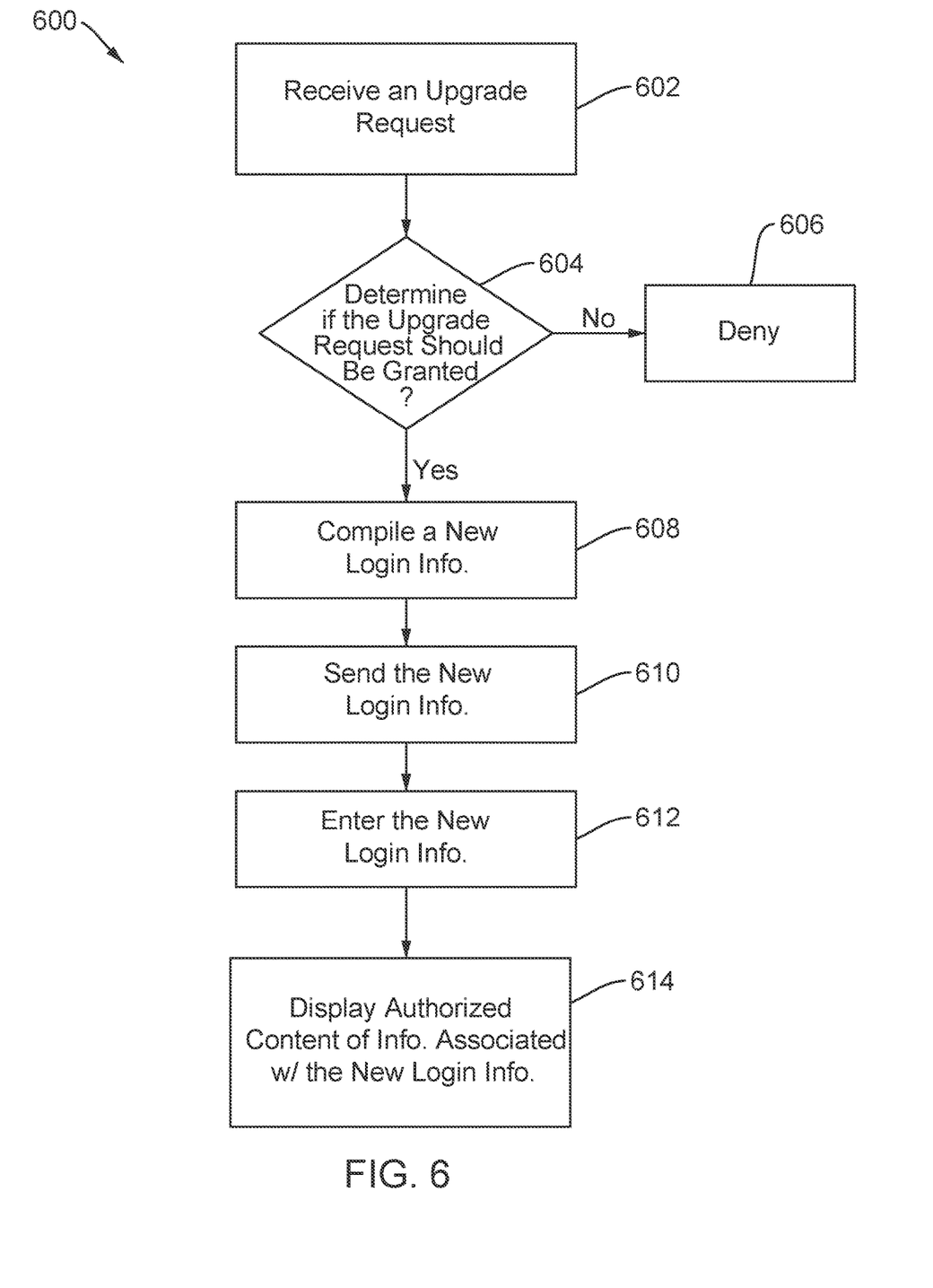
FIG. 6 illustrates a flow diagram for managing upgrading login information according to the disclosed embodiments.

The upgrade procedures will be described in FIG. 6. FIG. 6 is a flow diagram 600 illustrating managing upgrading login information according to the disclosed embodiments. At step 602, managing device 120 receives an upgrade request from debugging device 130 asking for upgrading the login information. The upgrade request includes texts or codes identifying the reasons for upgrade. Step 604 executes by managing device 120 determining if the request should be granted. If no, the request is denied at step 606.

When the request is granted, step 608 executes by managing device 120 compiling a new login information. The new login information may include at least a new password and/or a new user name. Further, the new login information is associated with a new policy and a time stamp. The time stamp allows debugging device 130 to access the data of computing system 110 at a higher layer of role, such as a manager role. In the disclosed embodiments, managing device 120 may upgrade the operator role of the technician to the manger role so that more content of information may be viewed and accessed by debugging device 130. The new policy may request data redaction activating device 150 to redact some sensitive information, for example, user's personal information, but keep the user name to be displayed. Alternatively, the new policy may allow all sensitive information to be shown in the content of information.

Further, step 610 executes by managing device 120 sending the new login information to debugging device 130. Step 612 executes by entering the new login information at debugging device 130. After authorizing the new login information, a new content of information associated with the new policy is displayed on debugging device 130 at step 614 so that the technician can access the data of computing system 110 to debug the problems.

The system and method of the disclosed embodiments manage login information based on job roles of a company's infrastructure and company policies so as to protect sensitive and private information from leaking out during a debugging process. The system and method of the disclosed embodiments may also be used to manage login information during normal conditions. That is, the managing system according to the disclosed embodiments sets up a number of roles, each of which is associated with a policy or a combination of policies. The policy or a combination of policies may include masking or block user name, user salary, user face, and other private information. The policy may also include masking or blocking company's net revenue, company's financial information, and other sensitive information.

Making or blocking data is performed by a data redacting activating device. Further, an operator, when his/her role has limitations of viewing sensitive content of information of a computing system, can request an upgrade of his/her login information. This is an important feature as the operator could ask for a temporary token (temporary login information) for a limited period of time so that he/she could access more information of the computing system to complete the debugging process. The token includes a new login information that has a new password and/or a new user name for the operator to use to enter the computing system. The new login information upgrades the job level of the operator so that he/she will be able to view more content of information.

In the disclosed embodiments, the login information assigned to each user has preset the role of the user. Therefore, there is no way for a user to view more information than the user's role allows, unless the user is approved by the managing system to upgrade his/her login information. In this manner, the security of the computing system can be further protected.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computing system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more content management systems coupled to a network capable of exchanging information and data. Various functions and components of the content management system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for managing login information of a computing system during a debugging process, the method comprising:
   entering login information to the computing system, the login information including a password,
   certifying the login information and authorizing a first content of the computing system to be displayed based on the login information;
   requesting an upgrade to view more content;
   receiving a new login information relative to the upgrade request, wherein the new login information includes a new password and a time stamp;
   entering the new login information to the computing system;
   displaying a second content of information of the computing system that is associated with the new login information, wherein the second content of information reveals more data of information than the first content of information,
   wherein the new login information is a stream of login data including at least a new password and a time stamp that expire after a predetermined period of time; and
   allowing an operator performing the debugging process to access the second content of information for a limited period of time according to the time stamp.

2. The method of claim 1, further comprising setting up a number of roles for personnel who are authorized to access the computing system, each of the number of roles has a different authorization level for viewing different content of information based on polices designated thereto.

3. The method of claim 2, wherein the policies are determined by an administrator of the computing system and are saved in a database.

4. The method of claim 2, wherein the policies enable at least removing or masking user names, showing user names, remove or mask sensitive data and showing sensitive data.

5. The method of claim 2, wherein the new login information is associated with a role that is authorized to view more content of the computing system.

6. The method of claim 1, further comprising redacting private or sensitive information of the computing system so that the first content of information contains redacted sensitive information.

7. A method for managing login information in a computing system during a debugging process, the method comprising:
   entering a login information including a username and a password to log into the computing system that requires a debugging assistance;
   displaying a first content of information based on the login information, wherein the login information is associated with a first authorization level;
   requesting a token for elevating the first authorization level for viewing more content of information, when the currently displayed certain content of information is not sufficient for an operator to debug an error;
   sending the token together with a new login information if the request for the token is granted,
   wherein the token includes an activation key and a limited activated time period, the new login information is associated with a second authorization level;
   allowing the operator to view more content of information according to the second authorization level; and
   allowing the operator to view the more content information during the debugging process for a limited period of time according the activation key and the limited activated time period.

8. The method of claim 7, wherein the login information includes system owner login information and system operator login information, and wherein the system owner login information has a higher authorized level for viewing more content of information than the system operator login information.

9. The method of claim 7, wherein requesting the token includes sending a text or a code regarding a reason for upgrading, and wherein the code is one of preset codes.

10. The method of claim 7, wherein the first content of information contains redacted sensitive information.

11. The method of claim 7, wherein a number of roles and the policies are managed by an administrator of the computing system.

12. The method of claim 7, wherein the policies include at least removing or masking user names, showing user names, remove or mask sensitive data and showing sensitive data.

13. A system for managing login information of a computing system, the system comprising:
- a managing module for setting up a number of roles for personnel who are permitted to access the computing system, wherein each of the number of roles has a different authorization level for viewing different content of information of the computing system based on policies designated thereto, and wherein each of the role is associated with a login information including at least a password;
- a login module for receiving and authenticating the login information, wherein the login information allows the personnel to view the designated content of information on the computing system;
- an activating module for activating viewable content relative to the login information in response to a result of the authentication received from the login module; and
- an upgrading module for upgrading the login information upon receiving an upgrade request, wherein the upgrading module communicates with the managing module to retrieve a new login information associated with an upgrade level and to send the new login information to an operator who requests the update,
- wherein the new login information is a stream of login data including at least a new password and a time stamp that is expired after a predetermined period of time,
- wherein the new login information allows the operator to view more content on the computing system for the predetermined period of time during a debugging process.

14. The system of claim 13, further comprising a login data stream transformer for transforming the login data into at least an owner log stream and an operator log stream, wherein the owner log stream has a higher authorization level for viewing more content of the computing system.

15. The system of claim 13, wherein the policies enable at least removing or masking user names, showing user names, remove or mask sensitive data and showing sensitive data.

16. The system of claim 13, wherein the policies are designated by an administrator and are saved in a database.

17. The system of claim 13, wherein the activating module further includes a data redacting device for redacting sensitive information in the designated content of information before displaying the designated content of information to a user who enters the login information.

18. The system of claim 13, wherein the new login information is composed by the managing module after determining which role level is granted based on the upgrade request.

* * * * *